(12) United States Patent
Kawamura et al.

(10) Patent No.: US 6,501,505 B1
(45) Date of Patent: Dec. 31, 2002

(54) TV LENS WITH FUNCTION OF AUTOMATICALLY ADJUSTING FLANGE BACK LENGTH

(75) Inventors: Hiroyuki Kawamura, Saitama (JP); Hiroshi Mizumura, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/175,577

(22) Filed: Oct. 20, 1998

(30) Foreign Application Priority Data

Oct. 20, 1997 (JP) .............................. 9-287195

(51) Int. Cl.[7] ................ H04N 5/262; H04N 5/225; H04N 5/232
(52) U.S. Cl. ................. 348/240.3; 348/347; 348/335
(58) Field of Search .................... 348/240.3, 347, 348/335, 240.99, 345; 396/79, 132

(56) References Cited

U.S. PATENT DOCUMENTS

| 4,198,126 A | * | 4/1980 | Abe et al. ................. 359/693 |
| 4,567,526 A | * | 1/1986 | Tsuchiya .................. 348/357 |
| 4,591,244 A | * | 5/1986 | Aono et al. .............. 359/688 |
| 4,748,509 A | * | 5/1988 | Otake et al. ............. 348/347 |
| 4,812,911 A | * | 3/1989 | Ohshima et al. ......... 348/368 |
| 4,991,944 A | * | 2/1991 | Hirao et al. ............. 359/698 |
| 5,038,163 A | * | 8/1991 | Hirasawa .................. 396/81 |
| 5,075,713 A | * | 12/1991 | Sakata ..................... 396/80 |
| 5,122,825 A | * | 6/1992 | Tokumaru et al. ........ 396/78 |
| 5,144,492 A | * | 9/1992 | Iijima et al. ............ 359/698 |
| 5,185,669 A | * | 2/1993 | Kato ..................... 348/223.1 |
| 5,323,200 A | * | 6/1994 | Hirasawa .................. 396/81 |
| 5,398,064 A | * | 3/1995 | Saka ...................... 348/347 |
| 5,416,519 A | * | 5/1995 | Ohtake ................... 348/347 |
| 5,771,410 A | * | 6/1998 | Sato et al. ............... 396/97 |
| 5,826,117 A | * | 10/1998 | Kawamura et al. ........ 396/79 |
| 6,219,098 B1 | * | 4/2001 | Kawamura et al. ....... 348/335 |
| 6,271,882 B1 | * | 8/2001 | Kawamura et al. ....... 348/335 |

* cited by examiner

*Primary Examiner*—Andrew Christensen
*Assistant Examiner*—Tia M. Harris
(74) *Attorney, Agent, or Firm*—Birch, Stewart, Kolasch & Birch, LLP (57) ABSTRACT

When an initialization switch of the TV lens is turned on, an iris is opened and a zoom lens group is moved to a telephoto end automatically. An AF function moves a focus lens group to focus the TV lens according to a focus evaluation value obtained from a video signal. Then, the zoom lens group is moved to a wide end, and the AF function moves a master lens group to focus the TV lens according to the focus evaluation value. The focusing with the focus lens group while the zoom lens group is placed at the telephoto end and the focusing with the master lens group while the zoom lens group is placed at the wide end are repeated alternately several times. Thus, the flange back length of the TV lens can be adjusted automatically.

5 Claims, 5 Drawing Sheets

TV LENS WITH FUNCTION OF AUTOMATICALLY ADJUSTING FLANGE BACK LENGTH

BACKGROUND OF THE INVENTION

1. Field of the Invention

This invention relates generally to a TV lens, and more particularly to a TV lens that simplifies the adjustment of a flange back length by utilizing the auto-focusing function.

2. DESCRIPTION OF RELATED ART

When a TV lens is attached to a TV camera, it is necessary to adjust a flange back length, which is the distance between an attachment plane (a flange plane) of the lens and a focal plane of the lens, so that the focal plane of the lens can match with an imaging surface of an imaging device (e.g., a CCD) in the camera.

To adjust the flange back length, a) an iris of the lens is opened, b) a zoom lens is set at a telephoto end and a focus lens is moved so that the TV lens can be focused, and c) the zoom lens is set at a wide end and an adjusting control, which is provided close to a lens mount, is turned to move a master lens so that the TV lens can be focused. Then, the above-mentioned steps b) to c) are repeated several times.

Adjusting the flange back length in the above-mentioned manner prevents the shift of the focal plane of the TV lens between cases where the zoom lens is placed at a telephoto side and the zoom lens is placed at a wide side.

The conventional TV lens, however, has a disadvantage because a cameraman has to adjust the flange back length manually, and thus, the adjustment is complicated.

SUMMARY OF THE INVENTION

The present invention has been developed in view of the above-described circumstances, and has as its object the provision of a TV lens that enables the automatic adjustment of the flange back length, thereby relieving the work load of the cameraman.

To achieve the above-mentioned object, the present invention is directed to a TV lens attached to a TV camera, the TV lens comprising: a focus lens group; a zoom lens group; a master lens group; a focus lens drive means for moving the focus lens group with a first motor; a zoom lens drive means for moving the zoom lens group with a second motor; a master lens drive means for moving the master lens group with a third motor; a first focusing means for focusing the TV lens by controlling the focus lens drive means according to a focus evaluation value representing a sharpness of an image, the image being projected on an imaging plane of the TV camera by the TV lens, the focus evaluation value being produced from a video signal converted from the image; a second focusing means for focusing the TV lens by controlling the master lens drive means according to the focus evaluation value; and a control means for adjusting a flange back length of the TV lens by controlling the zoom lens drive means and the first and the second focusing means such that focusing of the TV lens by the first focusing means while the zoom lens group is placed at a telephoto side and focusing of the TV lens by the second focusing means while the zoom lens group is placed at a wide side are repeated alternately at least once.

According to the present invention, when the TV lens is initialized, the zoom lens drive means places the zoom lens group at the telephoto side, and the first focusing means moves the focus lens group to focus the TV lens according to the focus evaluation value, thereafter the zoom lens drive means places the zoom lens group at the wide side, and the second focusing means moves the master lens group to focus the TV lens according to the focus evaluation value.

The procedure may be as follows: the zoom lens drive means places the zoom lens group at the wide side first, and the second focusing means moves the master lens group to focus the TV lens according to the focus evaluation value, thereafter the zoom lens drive means places the zoom lens group at the telephoto side, and the first focusing means moves the focus lens group to focus the TV lens according to the focus evaluation value.

As stated above, the focusing with the focus lens group while the zoom lens group is placed at the telephoto side and the focusing with the master lens group while the zoom lens group is placed at the wide side are repeated alternately several times, so that the focal plane of the TV lens can match with the imaging surface of the imaging device in the TV camera. Thus, the flange back length of the TV lens can be adjusted automatically, and the cameraman is saved from a great deal of trouble.

A manipulatable commanding means may be provided that commands the control means to start to adjust the flange back length of the TV lens. When the cameraman operates the commanding means, the initialization (the automatic adjustments of the flange back length) of the TV lens is started.

According to another embodiment of the present invention, the TV lens further comprises: a memory means for memorizing respective positions of the focus lens group and the zoom lens group when the commanding means commands the control means to start to adjust the flange back length of the TV lens; and a second control means for controlling the focus lens drive means and the zoom lens drive means such that the focus lens group and the zoom lens group are returned to their respective memorized positions after the flange back length of the TV lens is adjusted.

Consequently, after the flange back length is adjusted in accordance with the command from the commanding means, the focus lens group and the zoom lens group can automatically be returned to their respective positions before the initialization, so that the shooting can be performed continuously.

Furthermore, while the flange back length is adjusted, a display means indicates that the flange back length is currently adjusted. This enables the cameraman to easily know whether the initialization is in operation.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAIL DESCRIPTION OF THE PREFERRED EMBODIMENT

This invention will be described in further detail by way of example with reference to the accompanying drawings.

Figure 1:
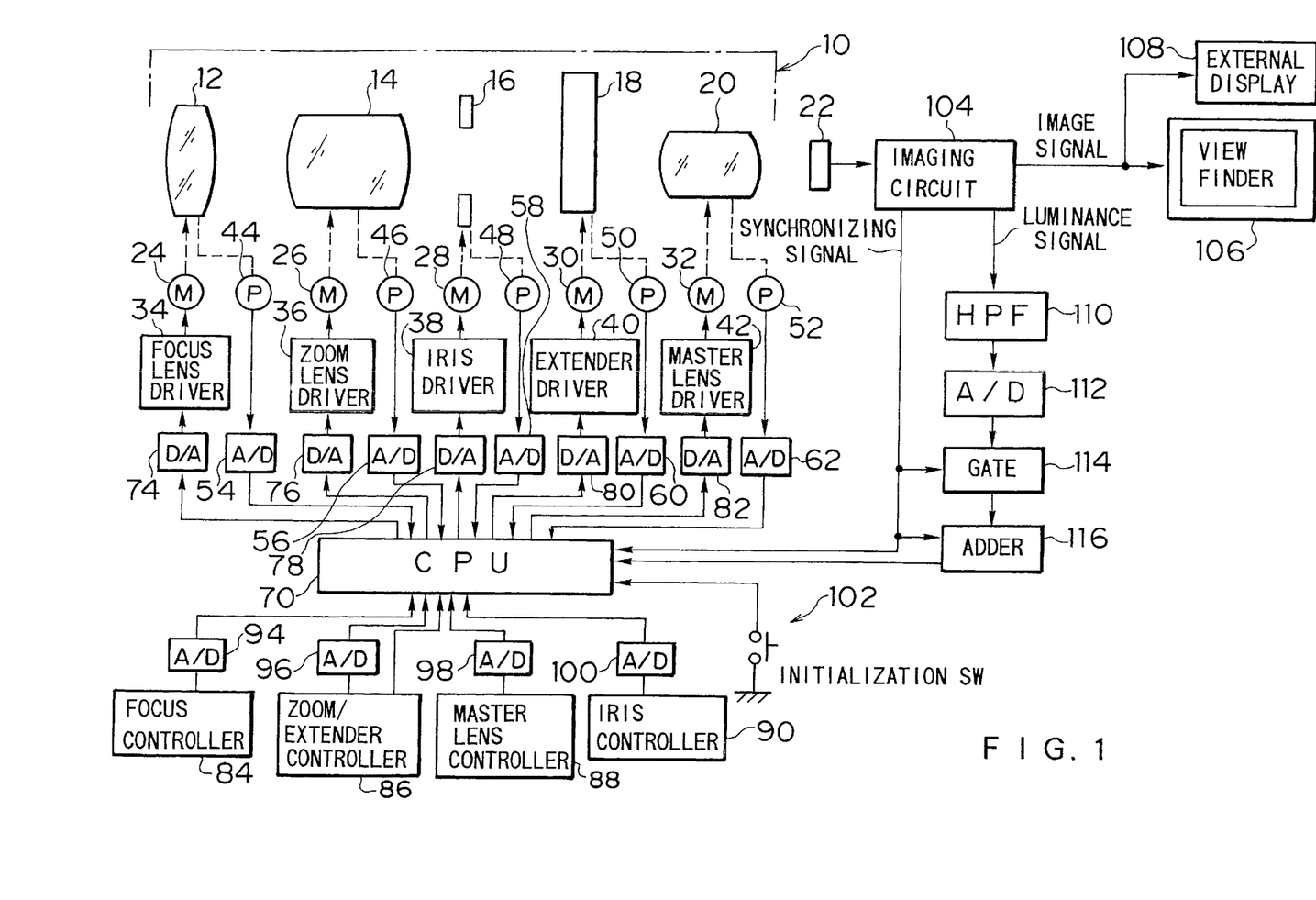
FIG. 1 is a block diagram illustrating the structure of a TV lens of an embodiment according to the present invention and a TV camera to which the TV lens is attached.

FIG. 1 is a block diagram illustrating the structure of a TV lens 10 of an embodiment according to the present invention and a TV camera to which the TV lens 10 is attached. As shown in FIG. 1, an optical system of the TV lens 10 comprises a focus lens group 12, a zoom lens group 14, an iris 16, an extender 18 and a master lens group 20. An image of a subject is projected on an imaging surface of a CCD 22 in the TV camera by the TV lens 10. Although simplified in the drawing, each of the lens groups 12, 14 & 20 is composed of one or more lenses.

The TV lens 10 is provided with motors 24, 26, 28, 30 & 32 for driving the focus lens group 12, the zoom lens group 14, the iris 16, the extender 18, and the master lens group 20, respectively; driving circuits 34, 36, 38, 40 & 42 for driving the motors 24, 26, 28, 30 & 32, respectively; potentiometers 44, 46, 48, 50 & 52 and A/D converters 54, 56, 58, 60 & 62 for determining the positions of the focus lens group 12, the zoom lens group 14, the iris 16, the extender 18, and the master lens group 20, respectively; and a central processing unit (CPU) 70 for controlling overall the actions of the lens groups 12, 14 & 20, the iris 16, the extender 18, etc. The CPU 70 sends signals for controlling the motors 24, 26, 28, 30 & 32 to the driving circuits 34, 36, 38, 40 & 42 through D/A converters 74, 76, 78, 80 & 82, respectively.

The focus lens group 12 is moved forward and backward along the optical axis by the driving force of the first motor 24 transmitted through a gear mechanism (not illustrated). The first motor 24 is driven by the focus lens driver 34 under the control of the CPU 70. The first potentiometer 44 determines the position of the focus lens group 12 (hereinafter referred to as a focus lens position), and the first potentiometer 44 sends a determination signal to the CPU 70 through the A/D converter 54.

Although not illustrated in detail, the zoom lens group 14 consists of a variable frame lens and a correction lens as is well known. Rotating a zoom cam cylinder moves the variable frame lens and the correction lens along the optical axis with predetermined positional relationship. The zoom lens group 14 is moved forward and backward along the optical axis by the driving force of the second motor 26 transmitted through a gear mechanism (not illustrated). The second motor 26 is driven by the zoom lens driver 36 under the control of the CPU 70. The second potentiometer 46 determines the position of the zoom lens group 14 (hereinafter referred to as a zoom lens position), and the second potentiometer 46 sends a determination signal to the CPU 70 through the A/D converter 56.

The iris 16 is driven to change its aperture by the driving force of the third motor 28 transmitted through a gear mechanism (not illustrated). The third motor 28 is driven by the iris driver 38 under the control of the CPU 70. The third potentiometer 48 determines a rotational position of the iris 16 (hereinafter referred to as an iris position), and the third potentiometer 48 sends a determination signal to the CPU 70 through the A/D converter 58. The CPU 70 knows an aperture value of the iris 16 in accordance with the determination signal.

Although not illustrated in detail, the extender 18 is constructed in such a way that a single extender lens and a double extender lens are arranged on a turret plate. The rotation of the turret plate results in the arrangement of either one of the extender lenses on the optical axis. The turret plate of the extender 18 is rotated by the driving force of the fourth motor 30 transmitted through a gear mechanism (not illustrated). The fourth motor 30 is driven by the extender driver 40 under the control of the CPU 70. The fourth potentiometer 50 determines a rotational position of the turret plate of the extender 18 (hereinafter referred to as an extender position), and the fourth potentiometer 50 sends a determination signal to the CPU 70 through the A/D converter 60. The CPU 70 knows the magnification of the extender lens that is arranged on the optical axis in accordance with the determination signal.

The master lens group 20 is capable of moving along the optical axis. Moving the master lens group 20 forward and backward results in the fine adjustment of the focal position (the flange back length adjustment) of the TV lens 10. The master lens group 20 is moved forward and backward along the optical axis by the driving force of the fifth motor 32 transmitted through a gear mechanism (not illustrated). The fifth motor 32 is driven by the master lens driver 42 under the control of the CPU 70. The fifth potentiometer 52 determines the position of the master lens group 20 (hereinafter referred to as a master lens position), and the fifth potentiometer 52 sends a determination signal to the CPU 70 through the A/D converter 62.

The CPU 70 knows the focus lens position, the zoom lens position, the iris position, the extender position, and the master lens position based on the determination signals from the potentiometers 44, 46, 48, 50 & 52, respectively, and the CPU 70 sends control signals to the drivers 34, 36, 38, 40 & 42 to thereby move the focus lens group 12, the zoom lens group 14, the iris 16, the extender 18, and the master lens group 20, respectively, to target positions.

The CPU 70 receives commands from control means such as a focus controller 84, a zoom/extender controller 86, a master lens controller 88 and an iris controller 90 through A/D converters 94, 96, 98 & 100, respectively. The CPU 70 controls the lens groups 12, 14 & 20, the iris 16 and the extender 18 in accordance with the commands. FIG. 1 shows the zoom/extender controller 86 into which a zoom controller (a zoom rate demand) and an extender controller (an extender changeover switch) are integrated. The zoom controller and the extender controller, however, may be provided independently of one another.

Figure 2:
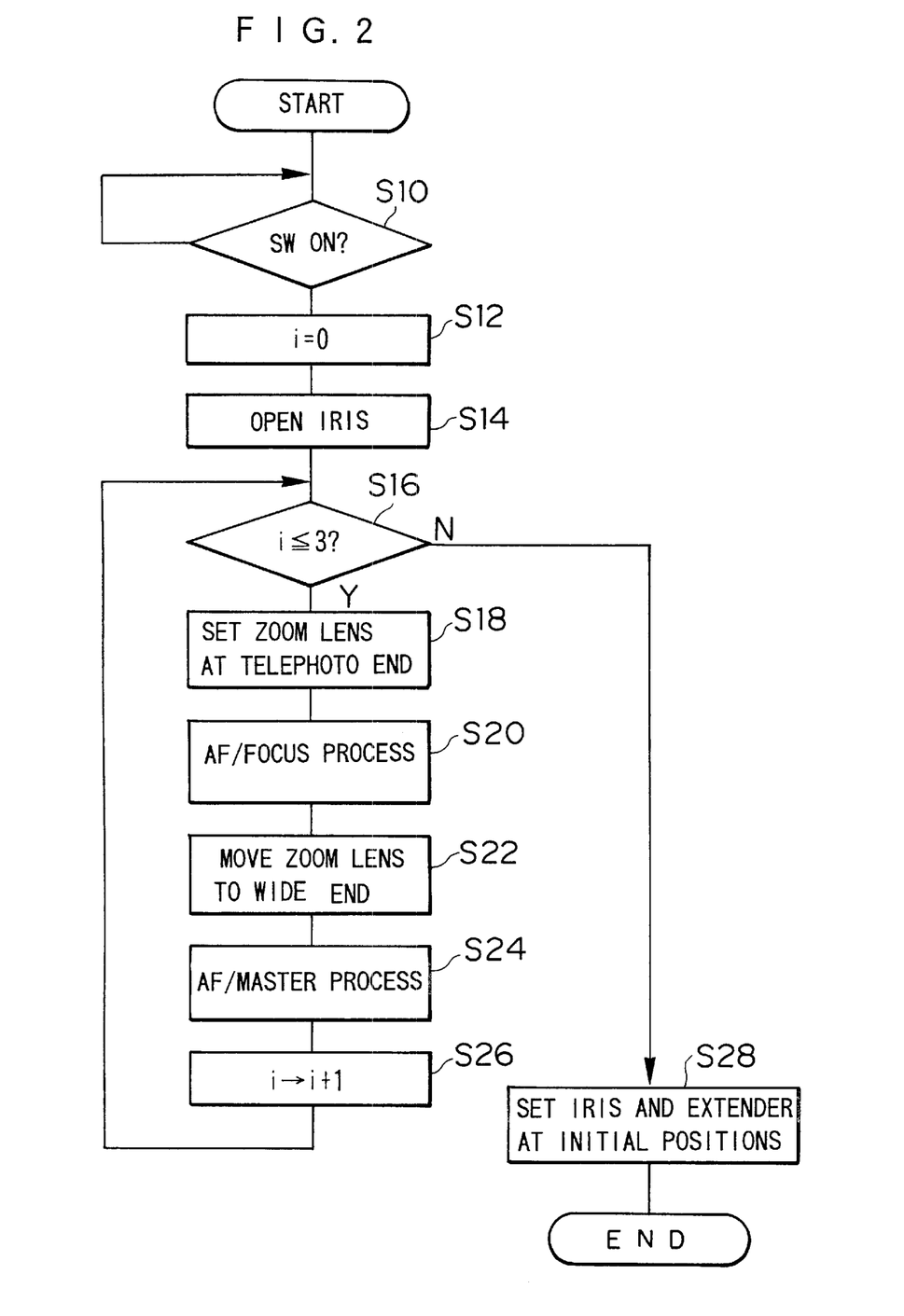
FIG. 2 is a flow chart showing a process of a CPU for performing an initialization.
Figure 3:
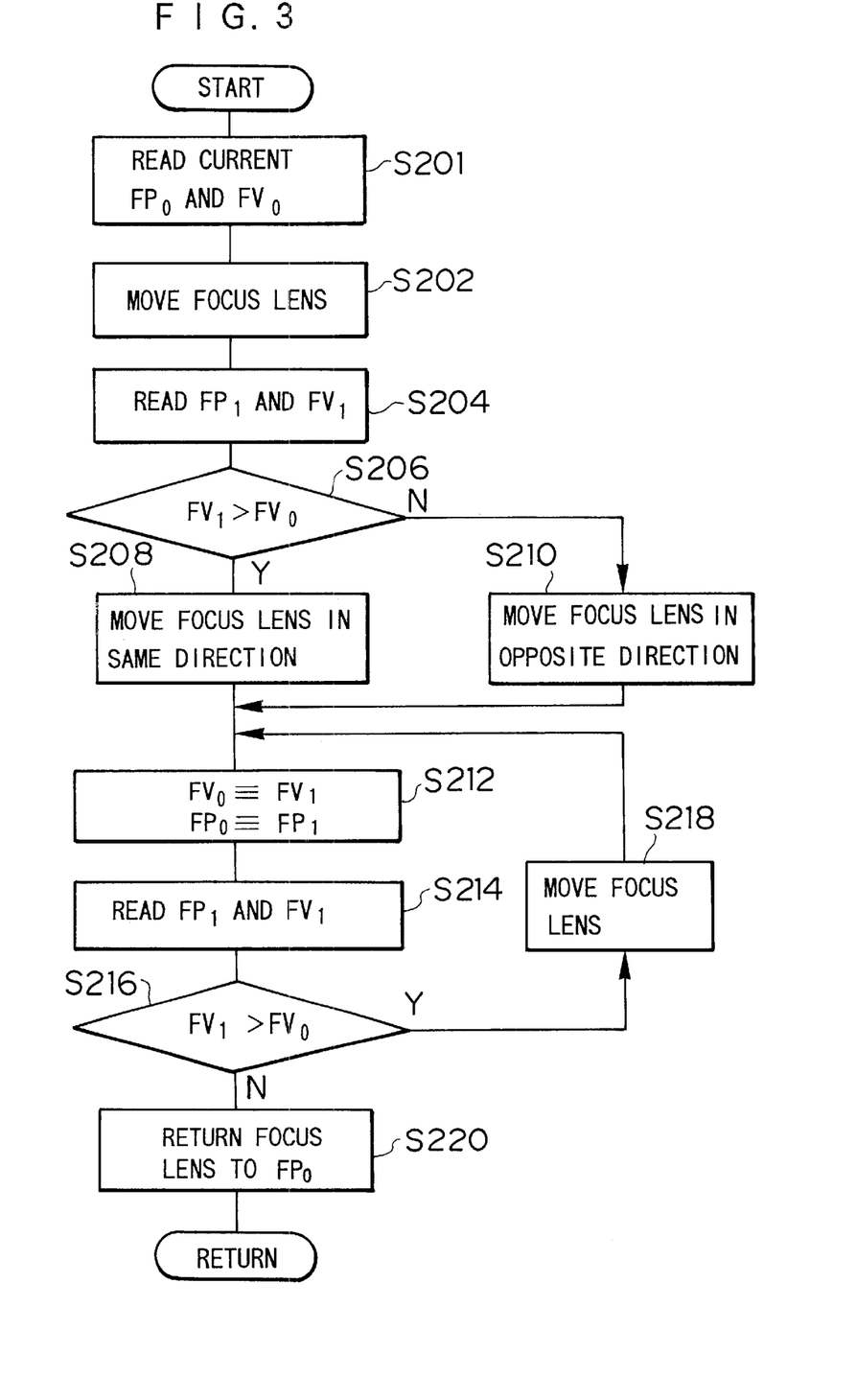
FIG. 3 is a flow chart showing an AF/focus process in FIG. 2.
Figure 4:
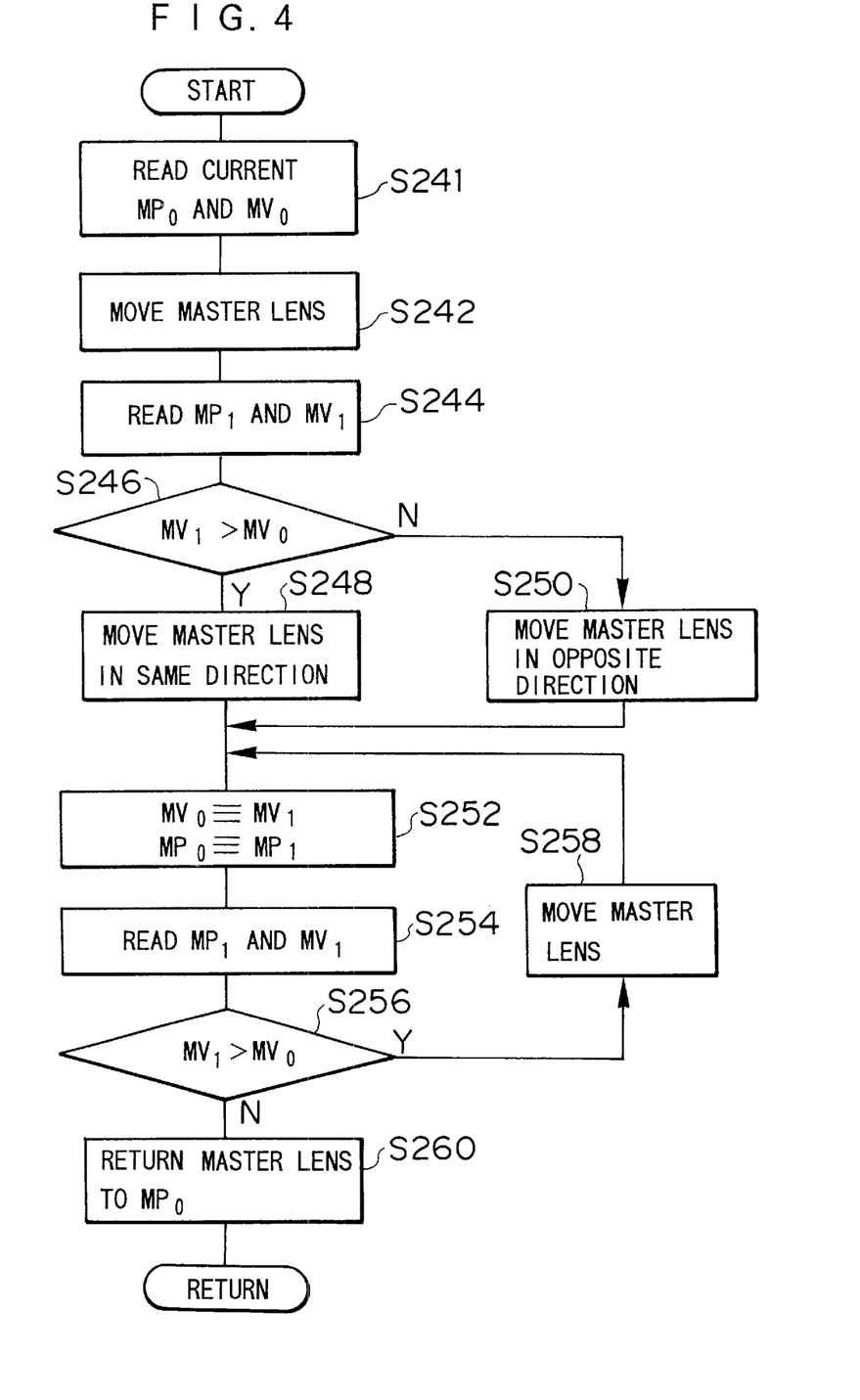
FIG. 4 is a flow chart showing an AF/master process in FIG. 2.

The CPU 70 also receives a control signal from an initialization switch 102. Turning on the initialization switch 102 causes the CPU 70 to execute an initialization of the TV lens 10 by driving the motors 24, 26, 28, 30 & 32 in accordance with a predetermined initialization process. The initialization process will be described later (FIGS. 2, 3 & 4).

The initialization switch 102 may be provided either at the TV lens 10 or at the TV camera. The initialization switch 102 may also be provided at a controller for remote control, and the initialization switch 102 may also be attached to another controller such as the focus controller 84 and the zoom/extender controller 86. Moreover, the initialization switch 102 may interlock with a power switch of the TV lens 10, so that the initialization switch 102 can be turned on automatically when the power switch of the TV lens 10 is turned on. For example, a process may be established in such a manner that the initialization is executed whenever the power switch is turned on, and the CPU 70 starts to execute the initialization when the CPU 70 detects that the power switch is turned on. In this case, the CPU 70 serves as the initialization switch 102, and it is therefore possible to omit the initialization switch 102 as a manipulatable control means.

The CCD 22 photoelectrically converts the subject image that is projected on the imaging surface of the CCD 22 by the TV lens 10 into an image signal, and the CCD 22 sends the image signal to an imaging circuit 104. The imaging circuit 104 produces a video signal (e.g., an NTSC signal) from the image signal, and the imaging circuit 104 sends the video signal to a viewfinder 106 and an external display 108. Thus, the shot image is displayed on the viewfinder 106 and the external display 108.

A high pass filter (HPF) 110, an A/D converter 112, a focus area selection gate 114, and an adder 116 connect to the imaging circuit 104 in series for finding a focus evaluation value. The imaging circuit 104 sends a luminance signal that is produced from the image signal to the HPF 110. The imaging circuit 104 also sends a synchronizing signal to the focus area selection gate 114, the adder 116 and the CPU 70 in accordance with the video signal.

The HPF 110 extracts high-frequency components from the luminance signal. The higher the sharpness of the image is, the more the high-frequency components are included in the luminance signal. The integration of the extracted high-frequency components results in the numerical representation of the sharpness level of the average image in the integration area.

The A/D converter 112 converts the high-frequency components of the luminance signal, which are extracted by the HPF 110, into digital signals. The A/D converter 112 sends the digitized signals to the focus area selection gate 114, which is a circuit that extracts only signals corresponding to a focus area located at the center of the shot image. The focus area selection gate 114 extracts only information relating to the main subject, which is projected in the focus area. The focus area selection gate 114 sends the extracted digital signals to the adder 116, which adds up the digital signals of one field. The adder 116 sends added value to the CPU 70 as the focus evaluation value, which represents the sharpness of the image.

The CPU 70 receives the focus evaluation value from the adder 116, and moves the focus lens group 12 and the master lens group 20 to positions where the focus evaluation value is the maximum based on a so-called "hill-climbing process" so that the TV lens 10 can be focused.

A description will be given of the process performed by the CPU 70.

FIG. 2 is a flow chart showing the process of the CPU 70 for performing the initialization of the TV lens 10. After the power switch of the TV lens 10 is turned on, the CPU 70 determines whether the initialization switch 102 is closed or not (S10). The step S10 is repeated until the initialization switch 102 is turned on. When the CPU 70 detects that the initialization switch 102 is turned on at S10, the CPU 70 sets a counter that indicates the number of times of operations at zero.

Then, the iris 16 is opened (S14), and the extender 18 is set at one magnification. The CPU 70 determines whether a value (i) of the counter is the preset number of operations (e.g., three) or less (i $\leq$3) (S16). If the value of the counter is three or less, the zoom lens group 14 is set at the telephoto end (S18). Then, the focus lens group 12 is moved to focus the TV lens 10 with the auto-focusing (AF) function according to the focus evaluation value (S20). This focusing process (hereinafter referred to as an AF/focus process) will be described later (FIG. 3).

After the focusing is performed by moving the focus lens group 12, the zoom lens group 14 is moved to the wide end (S22). Then, the master lens group 20 is moved to focus the TV lens 10 with the AF function according to the focus evaluation value (S24). This focusing process (hereinafter referred to as an AF/master process) will be described later (FIG. 4).

After the focusing is performed by moving the master lens group 20, the value of the counter is increased by one (S26) and the procedure returns to S16.

The steps S18–S26 are repeated three times. When the CPU 70 detects that the value of the counter is more than three at S16, the iris 16 and the extender 18 are set at the preset initial positions (S28) to finish the initialization (S30).

In the flow chart of FIG. 2, the zoom lens group 14 is set at the telephoto end first (S18), and the AF/focus process is performed (S20). Then, the zoom lens group 14 is moved to the wide end (S22), and the AF/master process is performed (S24). The present invention, however, should not be restricted to this, and a procedure may be as follows. The zoom lens group 14 is set at the wide end first, and the AF/master process is performed. Then, the zoom lens group 14 is moved to the telephoto end, and the AF/focus process is performed.

FIG. 3 shows the AF/focus process in FIG. 2. When the AF/focus process starts at S20 in FIG. 2, the procedure in FIG. 3 is started. First, a current focus lens position ($FP_0$) and a current focus evaluation value ($FV_0$) at $FP_0$ are read (S201). Then, the focus lens group 12 is moved in a preset direction (S202). The latest focus lens position ($FP_1$) after the movement and the latest focus evaluation value ($FV_1$) at $FP_1$ are read (S204).

Then, the focus evaluation values $FV_0$ and $FV_1$ are compared (S206) to determine a direction in which the focus lens group 12 is moved subsequently. If $FV_1>FV_0$ at S206, it is determined that the focus lens group 12 has been moved in such a direction as to raise the focus evaluation value, and the focus lens group 12 is moved in the same a direction as in S202 (S208). If $FV_1<FV_0$ at S206, the focus lens group 12 is moved in a direction opposite to the direction in S202 (S210).

Thereafter, a process for finding a peak of the focus evaluation value is performed. The previous focus evaluation value $FV_0$ is replaced with the latest focus evaluation value $FV_1$, which is obtained at S204, and the previous focus lens position $FP_0$ is replaced with the latest focus lens position $FP_1$, which is obtained at S204 (S212). Then, the latest focus lens position $FP_1$, and focus evaluation value $FV_1$, after the movement are read (S214), and the previous focus evaluation value $FV_0$ and the latest focus evaluation value $FV_1$ are compared (S216). If $FV_1>FV_0$ at S216, the focus lens group 12 is moved further in the same direction (S218), and the procedure returns to S212. The steps S212–S218 are repeated until the latest focus evaluation value $FV_1$, becomes smaller than the previous focus evaluation value $FV_0$, that is, until the peak of the focus evaluation value is found based on the hill-climbing process.

If the latest focus evaluation value $FV_1$, is smaller than the previous focus evaluation value $FV_0$ at S216, the previous focus evaluation value $FV_0$ is determined as being the peak of the focus evaluation value. Then, the focus lens group 12 is returned to the previous focus lens position $FP_0$ (S220). This completes the positional adjustment of the focus lens group 12 with the AF function, and the procedure returns to the main routine shown in FIG. 2.

FIG. 4 shows the AF/master process in FIG. 2. When the AF/master process starts at S24 in FIG. 2, the procedure in FIG. 4 is started. First, a current master lens position ($MP_0$) and a current focus evaluation value ($MV_0$) at $MP_0$ are read (S241). Then, the master lens group 20 is moved in a preset direction (S242). The latest master lens position ($MP_1$) after the movement and the latest focus evaluation value $MV_1$ at $MP_1$ are read (S244).

Then, the focus evaluation values $MV_0$ and $MV_1$ are compared (S246) to determine a direction in which the master lens group 20 is moved subsequently. If $MV_1 > MV_0$ at S246, the master lens group 20 is moved in the same direction as in S242 (S248). If $MV_1 < MV_0$ at S246, the master lens group 20 is moved in a direction opposite to the direction in S242 (S250).

Thereafter, a process for finding a peak of the focus evaluation value is performed. The previous focus evaluation value $MV_0$ is replaced with the latest focus evaluation value $MV_1$, which is obtained at S244, and the previous master lens position $MP_0$ is replaced with the latest master lens position $MP_1$, which is obtained at S244 (S252). Then, the latest master lens position $MP_1$ and focus evaluation value $MV_1$ after the movement are read (S254), and the previous focus evaluation value $MV_0$ and the latest focus evaluation value $MV_1$ are compared (S256). If $MV_1 > MV_0$ at S256, the master lens group 20 is moved further in the same direction (S258), and the procedure returns to S252. The steps S252–S258 are repeated until the latest focus evaluation value $MV_1$ becomes smaller than the previous focus evaluation value $MV_0$.

If the latest focus evaluation value $MV_1$ is smaller than the previous focus evaluation value $MV_0$ at S256, the previous focus evaluation value $MV_0$ is determined as being the peak of the focus evaluation value. Then, the master lens group 20 is returned to the previous master lens position $MP_0$ (S260). This completes the positional adjustment of the master lens group 20 with the AF function, and the procedure returns to the main routine shown in FIG. 2.

As stated above, turning on the initialization switch 102 moves the zoom lens group 14 to the telephoto end and the wide end and adjusts the positions of the focus lens group 12 and the master lens group 20 with the AF function automatically. Thus, the flange back length of the TV lens 10 can be adjusted automatically.

During the initialization, the display such as the viewfinder 106 and the external display 108 may indicate that the automatic adjustment of the flange back length is in operation.

Figure 5:
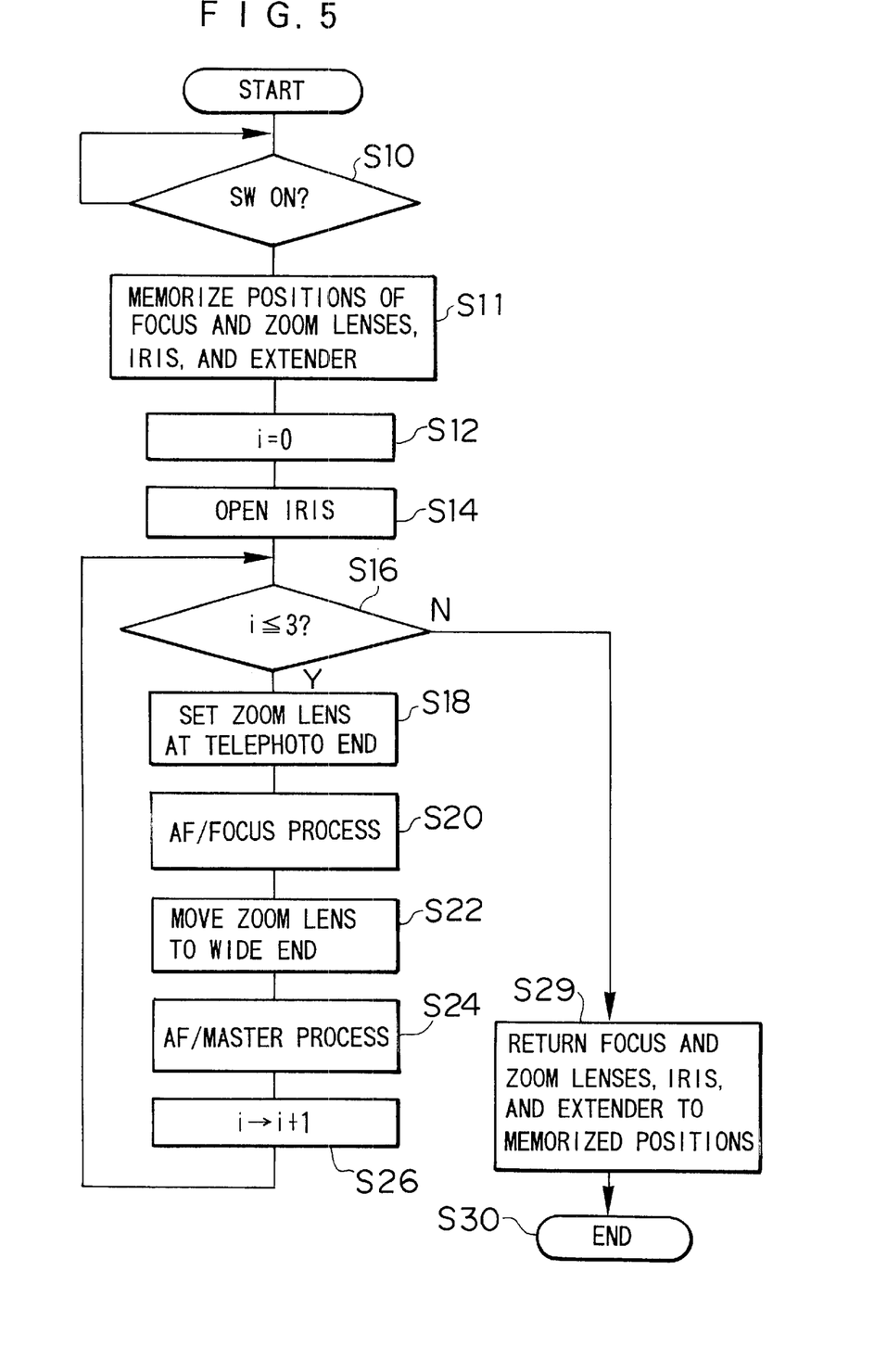
FIG. 5 is a flow chart showing another process of the CPU for performing an initialization.

FIG. 5 shows another example of process of the CPU 70 for performing the initialization of the TV lens 10. Steps similar to those described with reference to the flow chart in FIG. 2 are denoted by the same reference numerals, and they will not be described.

In the procedure in FIG. 5, a step (S11) is added between S10 and S12 in the procedure in FIG. 2, and a step (S29) is performed instead of S28 in the procedure in FIG. 2. At S11, the current positions of the focus lens group 12, the zoom lens group 14, the iris 16, and the extender 18 are memorized before the initialization, and at S29, the focus lens group 12, the zoom lens group 14, the iris 16, and the extender 18 are returned to the respective positions memorized at S11.

When the CPU 70 detects that the initialization switch 102 is turned on at S10, the CPU 70 stores the current positions of the focus lens group 12, the zoom lens group 14, the iris 16 and the extender 18 in a storage means such as a memory built in the CPU 70 (S11). The focusing of the TV lens 10 by moving the focus lens group 12 and the master lens group 20 are repeated the predetermined number of times as previously described. Thereafter, the focus lens group 12, the zoom lens group 14, the iris 16 and the extender 18 are returned to the respective positions stored in the storage means at S11 (S29).

Consequently, the focus lens position, the zoom lens position, the iris position and the extender position before the initialization are maintained after the initialization, and thus, the shooting conditions of the TV lens 10 can be fixed, which is particularly advantageous for the in-shooting adjustment of the flange back length of the TV lens 10 for precaution's sake prior to an important shooting.

As set forth hereinabove, according to the present invention, the focusing of the TV lens with the AF/focus process while the zoom lens group is located at the telephoto side and the focusing of the TV lens with the AF/master process while the zoom lens group is located at the wide side are repeated alternately. Thus, the flange back length of the TV lens can be adjusted automatically, which saves a great deal of trouble in the initialization.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A TV lens attached to a TV camera, the TV lens comprising:
   a focus lens group;
   a zoom lens group;
   a master lens group;
   focus lens drive means for moving the focus lens group with a first motor;
   zoom lens drive means for moving the zoom lens group with a second motor;
   master lens drive means for moving the master lens group with a third motor;
   first focusing means for focusing the TV lens by controlling the focus lens drive means according to a focus evaluation value representing a sharpness of an image, the image being projected on an imaging plane of the TV camera by the TV lens, the focus evaluation value being produced from a video signal converted from the image;
   second focusing means for focusing the TV lens by controlling the master lens drive means according to the focus evaluation value; and
   control means for adjusting a flange back length of the TV lens by controlling the zoom lens drive means and the first and the second focusing means such that focusing of the TV lens by the first focusing means while the zoom lens group is placed at a telephoto side and focusing of the TV lens by the second focusing means while the zoom lens group is placed at a wide side are repeated alternately at least once.

2. The TV lens as defined in claim 1, further comprising display means for indicating that the flange back length of the TV lens is currently adjusted.

3. The TV lens as defined in claim 1, further comprising commanding means for commanding the control means to start to adjust the flange back length of the TV lens.

4. The TV lens as defined in claim 3, further comprising:
   memory means for memorizing respective positions of the focus lens group and the zoom lens group when the commanding means commands the control means to start to adjust the flange back length of the TV lens; and
   second control means for controlling the focus lens drive means and the zoom lens drive means such that the focus lens group and the zoom lens group are returned to their respective memorized positions after the flange back length of the TV lens is adjusted.

5. The TV lens as defined in claim 3, further comprising display means for indicating that the flange back length of the TV lens is currently adjusted.

* * * * *